(12) United States Patent
Farmer et al.

(10) Patent No.: US 6,620,457 B2
(45) Date of Patent: Sep. 16, 2003

(54) METHOD FOR THERMAL BARRIER COATING AND A LINER MADE USING SAID METHOD

(75) Inventors: Gilbert Farmer, Cincinnati, OH (US); Thomas John Tomlinson, West Chester, OH (US); Raymond William Heidorn, Fairfield, OH (US); Jeffrey Arnold Fehrenbach, Cincinnati, OH (US); William Lee Imhoff, Hamilton, OH (US); Myron Edward Rutherford, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 09/905,798

(22) Filed: Jul. 13, 2001

(65) Prior Publication Data

US 2003/0010035 A1 Jan. 16, 2003

(51) Int. Cl.$^7$ .............................. B05D 1/02; B05D 1/38; B05D 3/12; B05D 7/22
(52) U.S. Cl. ...................... 427/235; 427/273; 427/427; 427/256
(58) Field of Search ................................. 427/421, 424, 427/427, 446, 455, 456, 235, 236, 271, 270, 273

(56) References Cited

U.S. PATENT DOCUMENTS

| | | | |
|---|---|---|---|
| 4,338,360 A | * | 7/1982 | Cavanagh et al. ........... 427/247 |
| 4,402,992 A | * | 9/1983 | Liebert ........................ 427/456 |
| 4,439,241 A | | 3/1984 | Ault et al. |
| 5,167,721 A | | 12/1992 | McComas et al. |
| 5,558,922 A | | 9/1996 | Gupta et al. |
| 5,771,577 A | | 6/1998 | Gupta et al. |
| 5,775,108 A | * | 7/1998 | Ansart et al. ................. 60/752 |
| 5,830,586 A | | 11/1998 | Gray et al. |
| 5,902,647 A | | 5/1999 | Venkataramani et al. |
| 6,004,620 A | * | 12/1999 | Camm ......................... 427/142 |
| 6,145,319 A | * | 11/2000 | Burns et al. .................. 60/755 |
| 6,408,629 B1 | * | 6/2002 | Harris et al. .................. 60/804 |

FOREIGN PATENT DOCUMENTS

WO    WO 99/23273    5/1999

OTHER PUBLICATIONS

Ebara Corp., "Cooling Hole Reworking Method For Engine Part," Patent Abstracts of Japan, Publication No. 08108400, 1996.

Ebara Corp., "Cooling Hole Re-Machining Method Of Engine Parts, And Cooling Hole Re-Machining Device To Be Used In The Method," Patent Abstracts of Japan, Publication No. 09158702, 1997.

* cited by examiner

*Primary Examiner*—Bret Chen
*Assistant Examiner*—William Phillip Fletcher, III
(74) *Attorney, Agent, or Firm*—V. G. Ramaswamy; Sonnenschein Nath & Rosenthal LLP

(57) ABSTRACT

A method of applying a thermal barrier coating system to a metal piece having cooling holes angled in a first direction and cooling holes angled in a second direction. The method includes spraying a bond coat on a first surface of the piece at angles with respect to the first and second directions and to a thickness selected in combination with the angles to prevent the bond coat from entirely filling any of the holes. A thermal barrier coating is sprayed on the bond coat at angles with respect to the first and second directions and to a thickness selected in combination with the angles to prevent the thermal barrier coating from entirely filling any of the holes. The method also includes spraying a high pressure fluid jet from a nozzle assembly through each hole generally parallel to the respective cooling hole.

20 Claims, 8 Drawing Sheets

METHOD FOR THERMAL BARRIER COATING AND A LINER MADE USING SAID METHOD

BACKGROUND OF THE INVENTION

The present invention relates generally to a method for applying thermal barrier coatings to metal pieces and the resulting pieces, and more particularly to a method for applying a coating system to a gas turbine engine combustion chamber liner having cooling holes and the resulting liner.

Various methods are used to protect metal pieces exposed to high temperature environments. For instance, cooling air is sometimes blown over the piece. In some applications such as aircraft engine combustion chamber liners, cooling holes are formed in the liner for directing film cooling air through the liner and over surfaces of the liner exposed to high temperatures. The film cooling air cools the liner and forms a fluid barrier between the liner and hot gases which flow through the engine to prevent the gases from directly contacting the liner.

In addition, thermal barrier coating systems are applied to surfaces of metal pieces exposed to high temperature environments to reduce the amount of heat transferred to the piece. However, applying thermal barrier coating systems to pieces having cooling holes may cause the holes to become blocked thereby reducing cooling. In order to overcome this problem, the cooling holes in new pieces are often formed (e.g., by laser drilling) after the piece is coated. However, forming the cooling holes after the piece is coated generates significant heat which can negatively affect the life of the piece. To avoid this problem, the cooling holes are sometimes made first and masked before applying the coating to ensure the holes are not blocked by the coating. However, masking increases the manufacturing cost. Methods of removing coatings from the cooling holes using high pressure fluid jets have been developed to eliminate the need for masking. Although these methods work well for metal pieces having cooling holes which are angled in a uniform direction, a method for coating pieces having film cooling holes angled in more than one direction has not been developed.

SUMMARY OF THE INVENTION

Briefly, the present invention includes a method of applying a thermal barrier coating system to a metal piece having a first plurality of cooling holes angled in a first direction through the piece from a first surface of the piece to a second surface of the piece opposite the first surface, and a second plurality of cooling holes angled in a second direction different than the first direction through the piece from the first surface to the second surface. The method comprises spraying a bond coat on the first surface of the piece at angles with respect to the first direction and the second direction and to a thickness selected in combination with the angles to prevent the bond coat from entirely filling any hole within the first plurality of cooling holes or any hole within the second plurality of cooling holes. Further, the method includes spraying a thermal barrier coating on the bond coat at angles with respect to the first direction and the second direction and to a thickness selected in combination with the angles to prevent the thermal barrier coating from entirely filling any hole within the first plurality of cooling holes or any hole within the second plurality of cooling holes. A high pressure fluid jet is sprayed from a nozzle assembly through each hole within the first plurality of cooling holes in a direction generally parallel to the first direction and through each hole within the second plurality of cooling holes in a direction generally parallel to the second direction.

In another aspect, the invention includes an annular liner for use in a combustor. The liner comprises an annular shell surrounding an axial centerline having an upstream end, a downstream end, a first plurality of cooling holes angled in a first direction through the shell from an outer surface to an inner surface, and a second plurality of cooling holes angled in a second direction different than the first direction through the shell from the outer surface to the inner surface. Further, the liner includes a thermal barrier coating system applied to the inner surface of the shell. Fluid flow through each of the holes in the first plurality of cooling holes and the second plurality of cooling holes is substantially unobstructed by the thermal barrier coating system.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
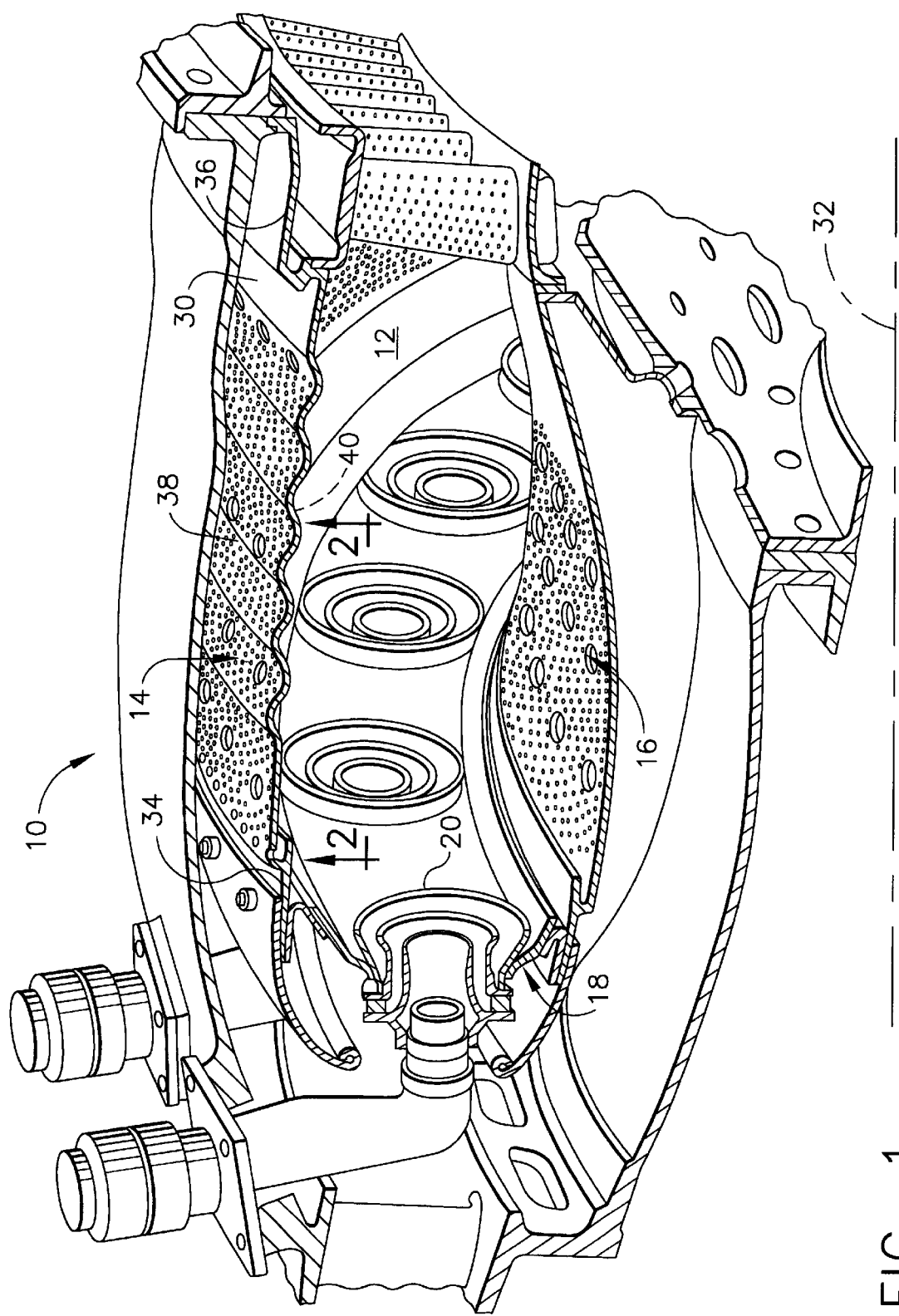
FIG. 1 is a cross-sectional perspective of a gas turbine engine combustor of the present invention.

Referring to the drawings and in particular to FIG. 1, a portion of a gas turbine engine, and more particularly a combustor of the present invention is designated in its entirety by the reference number 10. The combustor 10 defines a combustion chamber 12 in which combustor air is mixed with fuel and burned. The combustor 10 includes an outer liner, generally designated by 14, and an inner liner, generally designated by 16. The outer liner 14 defines an outer boundary of the combustion chamber 12, and the inner liner 16 defines an inner boundary of the combustion chamber. An annular dome, generally designated by 18, mounted upstream from the outer liner 14 and the inner liner 16, defines an upstream end of the combustion chamber 12. Mixer assemblies or mixers 20 positioned on the dome 18 deliver a mixture of fuel and air to the combustor chamber 12. Other features of the combustor 10 are conventional and will not be discussed in further detail.

Although the outer and inner liners 14, 16, respectively, have different shapes, they have a similar construction. Thus, for brevity only the outer liner 14 will be described in further detail. The outer liner 14 includes an annular shell 30 surrounding an axial centerline 32. The shell 30 has an upstream end 34 which attaches to the combustor dome 18 and a downstream end 36 opposite the upstream end. Further, the liner 14 has a first or outer surface 38 and a second or inner surface 40 opposite the outer surface.

Figure 2:
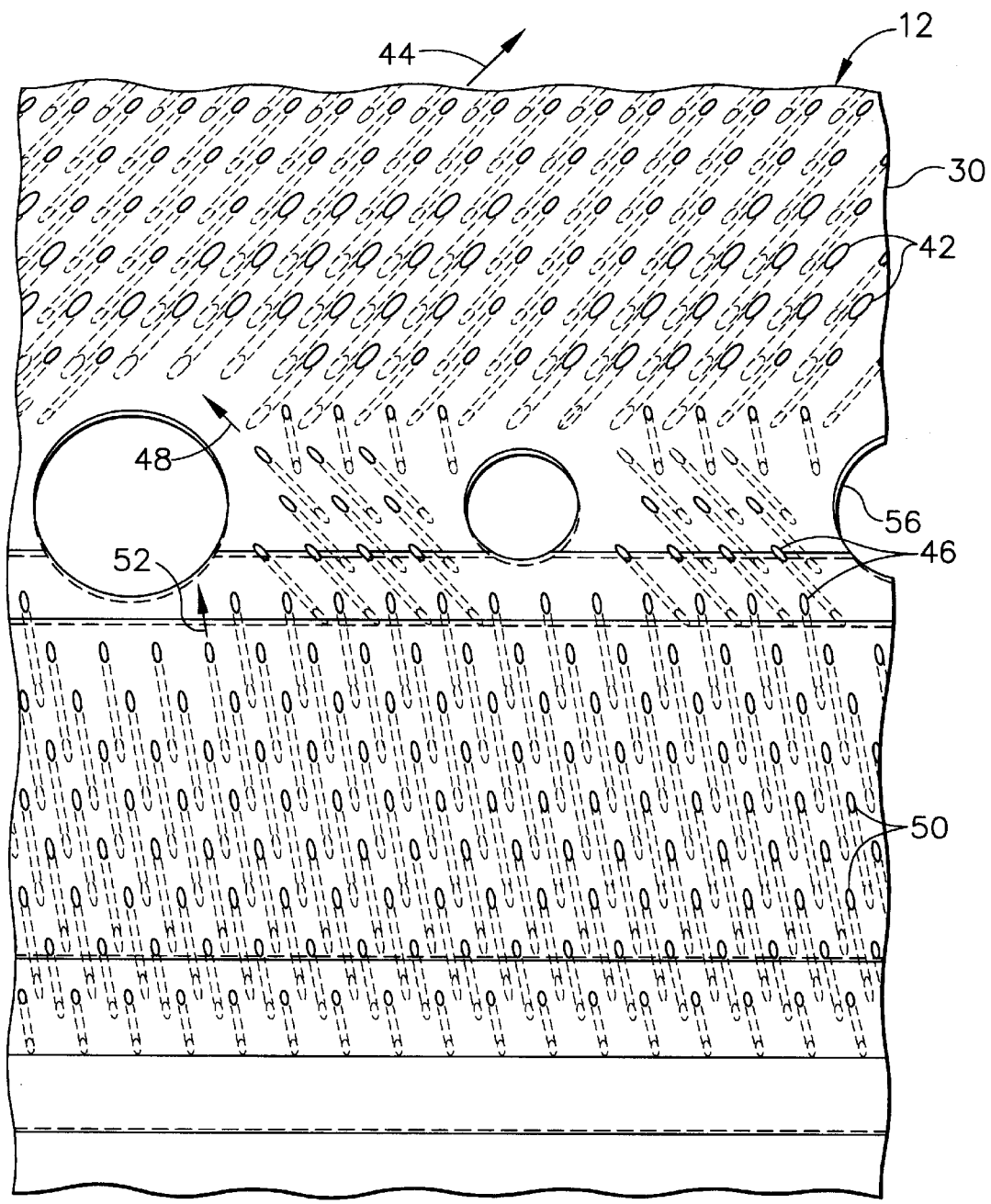
FIG. 2 is a fragmentary view of a portion of a combustor liner taken in the plane of line 2—2 of FIG. 1.

As illustrated in FIG. 2, the liner 14 includes a first plurality of cooling holes, each of which is designated by 42, extending through the shell 30 from the outer surface 38 to the inner surface 40. Although the holes 42 may extend in other directions without departing from the scope of the present invention, in one embodiment each of the holes extends in a first direction 44 angled circumferentially about 45 degrees with respect to the centerline 32 as illustrated in FIG. 2. A second plurality of cooling holes, each of which is designated by 46, extends through the shell 30 from the outer surface 38 to the inner surface 40 in a second direction 48 different than the first direction 44. Although the holes 46 may extend in other directions without departing from the scope of the present invention, in one embodiment the second direction 48 has a circumferential component opposite that of the first direction 44 and is angled circumferentially about 45 degrees with respect to the centerline 32. A third plurality of cooling holes, each of which is designated by 50, extends through the shell 30 from the outer surface 38 to the inner surface 40. Although the holes 50 may extend in other directions without departing from the scope of the present invention, in one embodiment each of the holes extends in a third direction 52 angled circumferentially about 10 degrees with respect to the centerline 32. Although the holes 42, 46, 50 may extend in other directions without departing from the scope of the present invention, in one embodiment each of the cooling holes extends axially downstream from the outer surface 38 to the inner surface 40 of the shell 30 at an angle 54 (FIG. 5) of about twenty degrees with respect to the inner surface of the shell. In addition to the film cooling holes, the shell 30 also includes a plurality of dilution holes 56 for introducing air into the combustor chamber 20.

Conventionally, all film cooling holes in a liner are oriented in the same direction. In the present invention, however, different groupings of the film cooling holes are provided with different circumferential orientations as explained above to provide an overall hole configuration which effectively cools the entire liner 14. As will be understood by those skilled in the art, the second and third pluralities of cooling holes 46, 50, respectively, are positioned downstream from features which disrupt flow such as the dilution holes 56, borescope holes (not shown), and igniter ports (not shown). The second and third pluralities of cooling holes 46, 50 are directed to portions of the liner 14 which experienced overheating and burning in prior engine run hardware. Thus, the orientations of the second and third pluralities of cooling holes eliminate or reduce overheating and burning associated with the flow disrupting features.

In order to reduce heat transfer through the liner 14, a conventional thermal barrier coating system (i.e., bond coats and thermal barrier coatings), generally designated by 58 (FIG. 7), is applied to the inner surface 40 of the liner 14. Fluid flow through each of the cooling holes 42, 46, 50 is substantially unobstructed by the thermal barrier coating system 58. Other features of the liner 14 are conventional and will not be discussed in further detail. With the exception of applying the thermal barrier coating system 58 to the liner 14, the liner is made by conventional methods which will not be described in detail.

Figure 3:
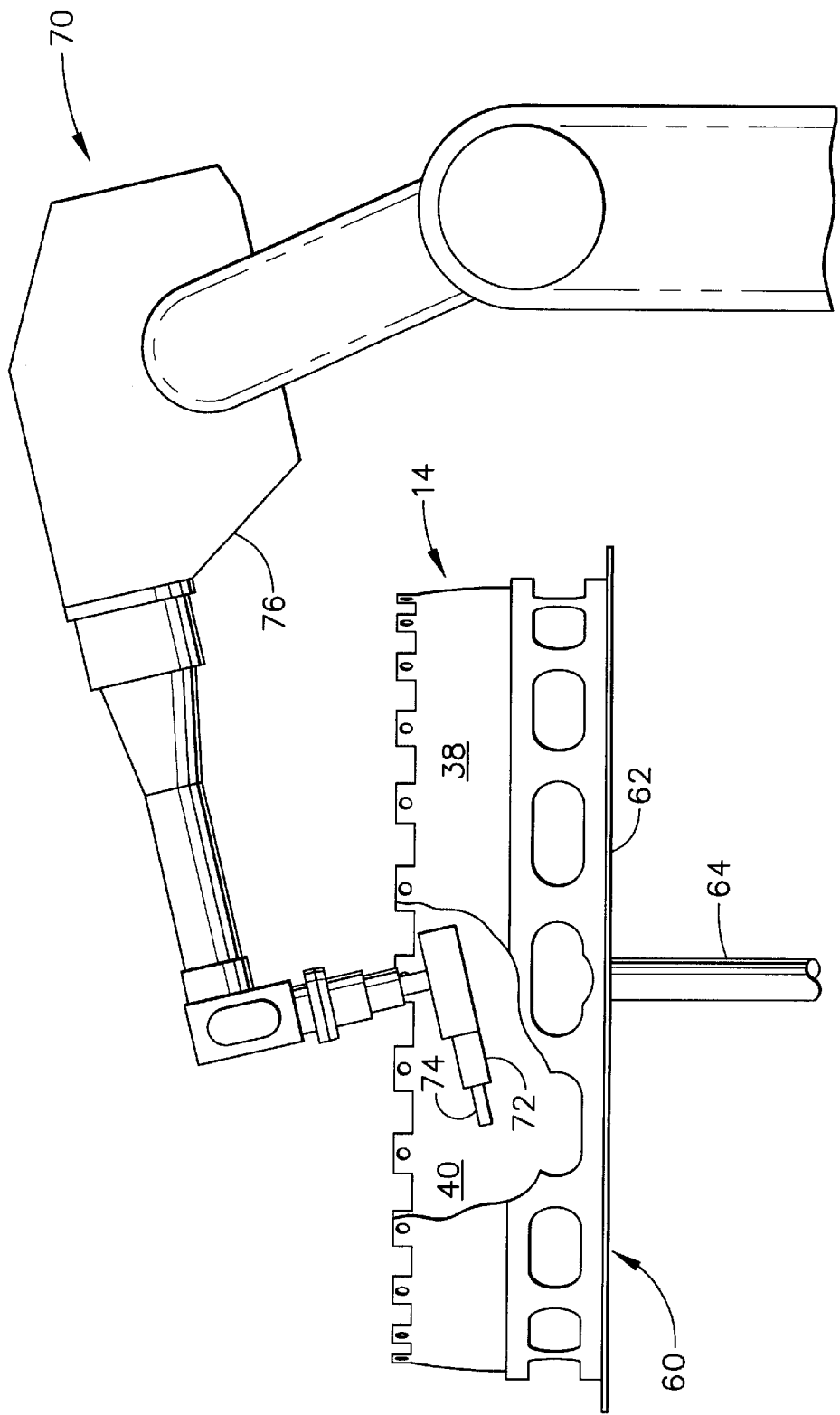
FIG. 3 is an elevation of a thermal barrier coating spray apparatus used in the method of the present invention.

To apply the thermal barrier coating system 58, the liner 14 is positioned on a conventional turntable, generally designated by 60, having a support 62 sized and shaped for receiving the liner and a central vertical shaft 64 for rotating the support as illustrated in FIG. 3. A conventional thermal barrier coating spray apparatus, generally designated by 70, is provided adjacent the turntable 60 for applying the thermal barrier system 58 to the inner surface 40 of the liner. The apparatus 70 includes a spray head 72 having a nozzle 74 through which the thermal barrier system is sprayed and a robotic arm 76 for manipulating the head into position relative to the liner 14. Although other apparatus may be used without departing from the scope of the present invention, the thermal barrier coating spray apparatus 70 of the preferred embodiment is an ATCS plasma system with an 8-axis computer numerically controlled Fanuc robot system available from Sulzer Metco of Westbury, N.Y.

Figure 4:
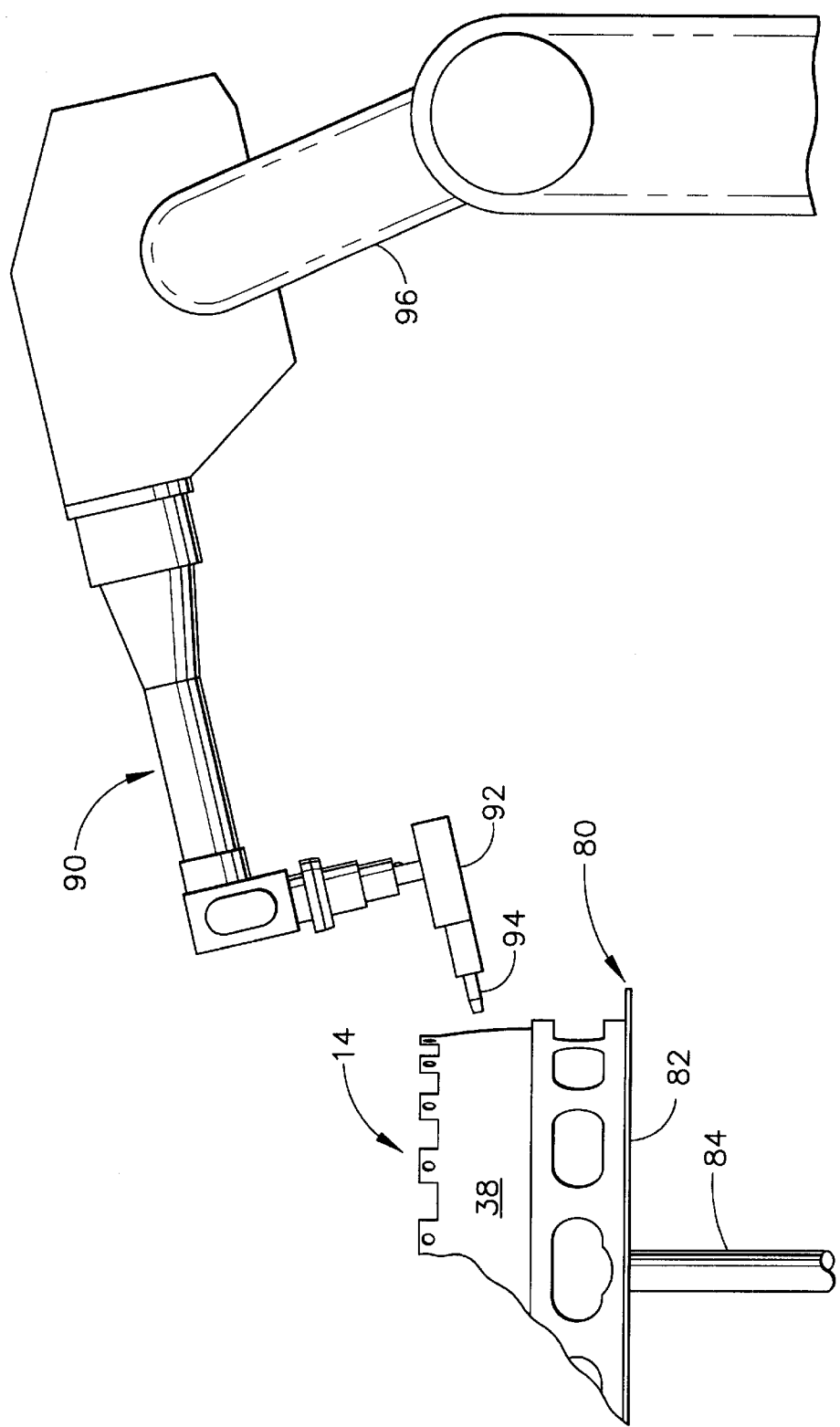
FIG. 4 is an elevation of a water jet apparatus used in the method of the present invention.

FIG. 4 illustrates the liner 14 received by another conventional turntable, generally designated by 80, comprising a support 82 and a central vertical shaft 84 for rotating the support. A conventional water jet apparatus, generally designated by 90, adjacent the turntable 80 sprays water toward the outer surface 38 of the liner 14. The water jet apparatus 90 includes a spray head 92 having a nozzle 94 for spraying a high pressure jet of fluid such as water toward the liner and a robotic arm 96 for manipulating the head into position relative to the liner 14. Although other apparatus may be used without departing from the scope of the present invention, the water jet apparatus 90 of the preferred embodiment is a Model No. 1015 5-axis computer numerically controlled water jet system available from Progressive Technologies of Grand Rapids, Mich. As the previously described thermal barrier coating spray apparatus 70 and water jet apparatus 90 are conventional and well understood by those skilled in the art, they will not be described in further detail.

Figure 5:
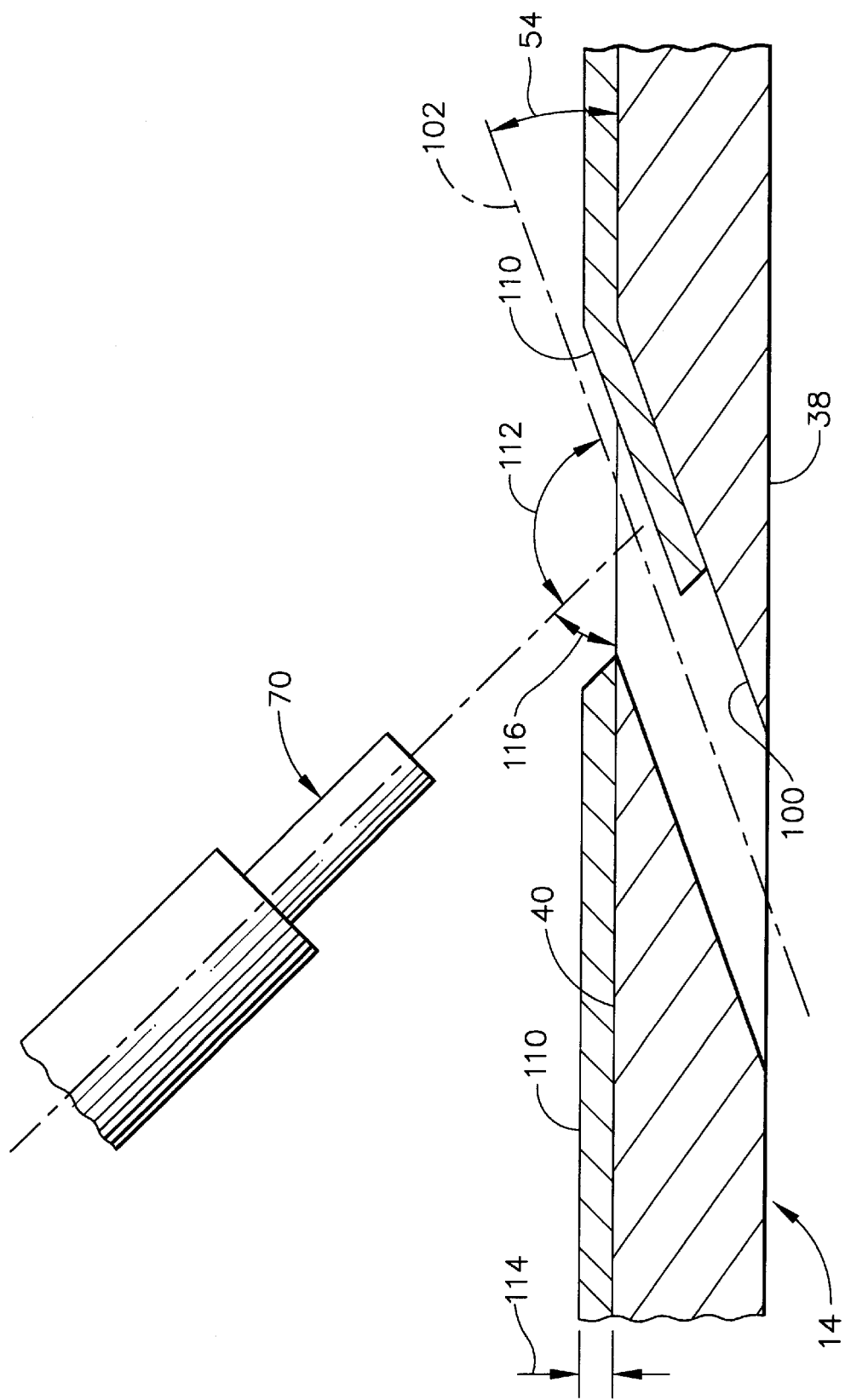
FIG. 5 is a cross section of a piece having a bond coat applied by the thermal barrier coating spray apparatus.

As described above, the liner 14 includes several pluralities of cooling holes 42, 46, 50. As illustrated in FIG. 5, each of these cooling holes (only one of which is shown) is defined by a tubular surface 100. Each cooling hole extends along a central axis 102 through the liner 14 from the outer surface 38 of the liner to the inner surface 40. The central axis 102 of each hole is oriented at the aforementioned angle 54 (e.g., twenty degrees) with respect to the inner surface 40 of the liner 14. The size of the hole is not critical to the present invention.

As further illustrated in FIG. 5, the thermal barrier coating spray apparatus 70 sprays a bond coat 110 such as NiCrAlY on the inner surface 40 of the liner 14 at a spray angle 112 measured with respect to the central axis 102 of the hole and to a thickness 114 selected in combination with the angle 112 to prevent the bond coat from entirely filling the hole. Although the spray angle 112 may vary without departing from the scope of the present invention, the angle 112 is preferably greater than ninety degrees (i.e., obtuse) to minimize the amount of bond coat sprayed on the surface 100 defining the hole opposite the spray nozzle 76. Further, the bond coat 110 is preferably sprayed on the inner surface 40 at an angle of incidence 116 measured with respect to the first surface of at least about 45 degrees. Angles of incidence 116 less than about 45 degrees tend to cause the coat 110 to have unmelted areas, voids and lower tensile strength.

As previously mentioned, the spray angle 112 and the thickness 114 are selected in combination to prevent the bond coat from entirely filling the hole. For example, for a liner 14 having nominal 0.020 to 0.030 inch diameter holes extending at an angle 54 of approximately twenty degrees, the bond coat 110 may be sprayed on the inner surface 40 at an angle of incidence 116 of about 45 degrees and an angle 112 with respect to the central axis 102 of the hole of about 135 degrees. Further, the bond coat 110 is sprayed to a thickness 114 of between about 0.004 inches and about 0.010 inches, and more preferably to a thickness of between about 0.004 inches and about 0.006 inches. As will be appreciated by those skilled in the art, the angles and thickness may be varied without departing from the scope of the present invention. However, it is desirable that the angle 112 measured with respect to the central axis 102 and the thickness 116 be selected so that the bond coat does not entirely fill the hole. The unfilled portion of the hole provides a pilot hole so that the water jet apparatus can remove the bond coat 110 from the hole as will be explained below.

Although the spray angle 112 and thickness 114 specified above have been found to be effective to prevent the bond coat 110 from entirely filling the holes 42, 46, 50, those skilled in the art will appreciate that considerable process simplification can be accomplished by maintaining a constant angle of incidence 116 and allowing the spray angle to vary between the first, second and third pluralities of cooling holes. For example, for a liner 14 having cooling holes 42, 46, 50 oriented as specified above, it has been found that the bond coat 110 may be applied in a direction having no circumferential component and at an angle of incidence 116 of about 45 degrees downstream. For liners 14 having other cooling hole orientations, the spray angle 112 and thickness 114 may be determined by trial and error.

Figure 6:
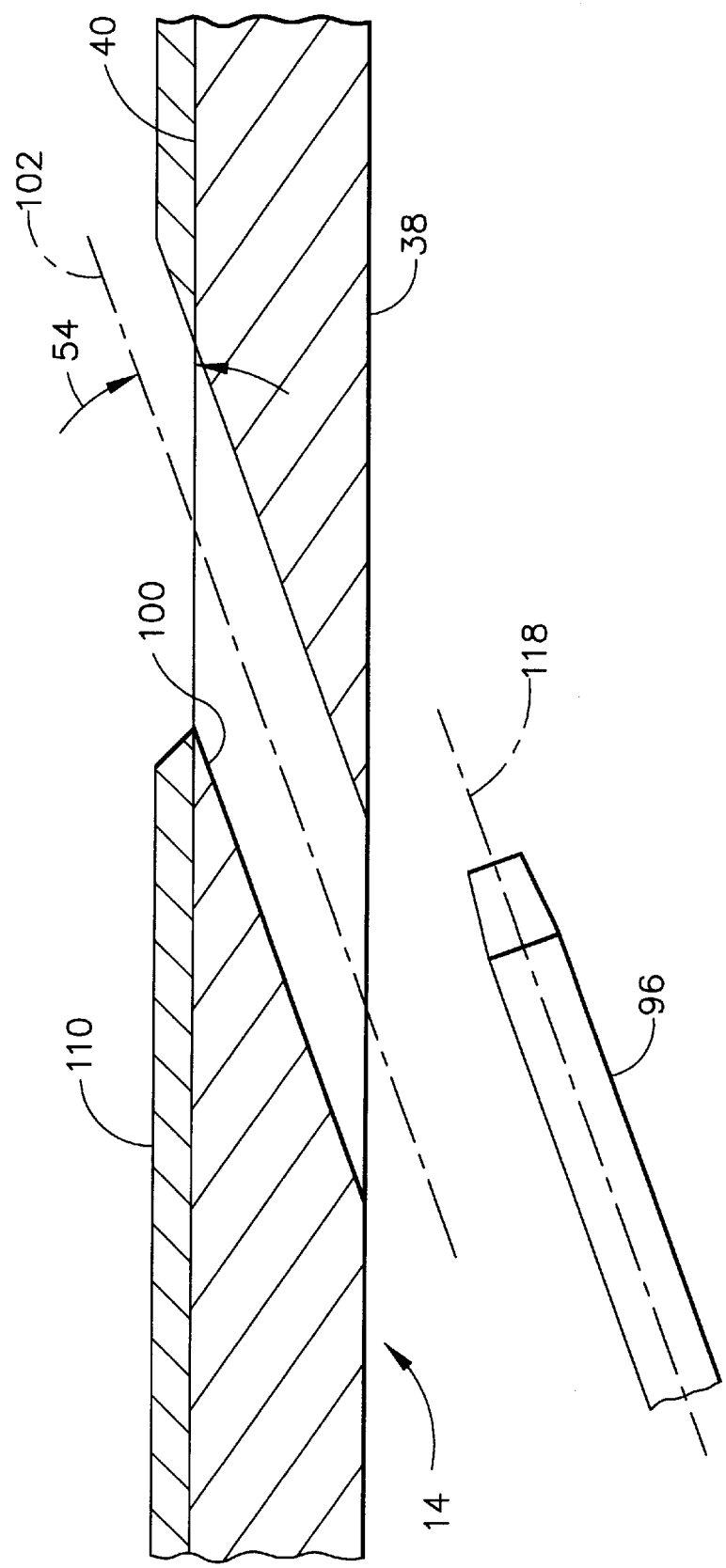
FIG. 6 is a cross section of the piece after the bond coat is removed from a cooling hole by the water jet apparatus.

After the bond coat 110 is applied, the liner 14 is placed on the turntable support 80 adjacent the water jet apparatus 90. As shown in FIG. 6, the water jet apparatus 90 sprays a high pressure water jet toward the hole from a nozzle 96 facing the outer surface 38 of the liner 14 and in a direction 118 generally parallel to the central axis 102 of the hole. Unlike the bond coat 110 which can be applied at a constant angle of incidence 116 to simplify the process, the high pressure water jet must be aimed in a direction generally parallel to the first direction 44 when spraying the high pressure fluid jet through each hole within the first plurality of cooling holes 42, aimed in a direction generally parallel to the second direction 48 when spraying the high pressure fluid jet through each hole within the second plurality of cooling holes 46, and aimed in a direction generally parallel to the third direction 52 when spraying the high pressure fluid jet through each hole within the third plurality of cooling holes 50.

The water jet is substantially free of solid particulate so the jet removes only the bond coat 110 from the hole 102 without removing metal from the liner 14. As previously mentioned, a pilot hole is needed to permit the water jet to remove the bond coat 110 from the hole. This is because the water jet abrades the bond coat 110 rather than pushing it from the hole. If the pilot hole is not present, the abrasion capability of the water jet is reduced. Although the water jet may be sprayed at other pressures without departing from the scope of the present invention, the water jet apparatus of the preferred embodiment produces a water jet having a pressure of between about 5000 pounds per square inch and about 50,000 pounds per square inch. Preferably, the water jet is sprayed from the nozzle 96 at a pressure of about 45,000 pounds per square inch.

Figure 7:
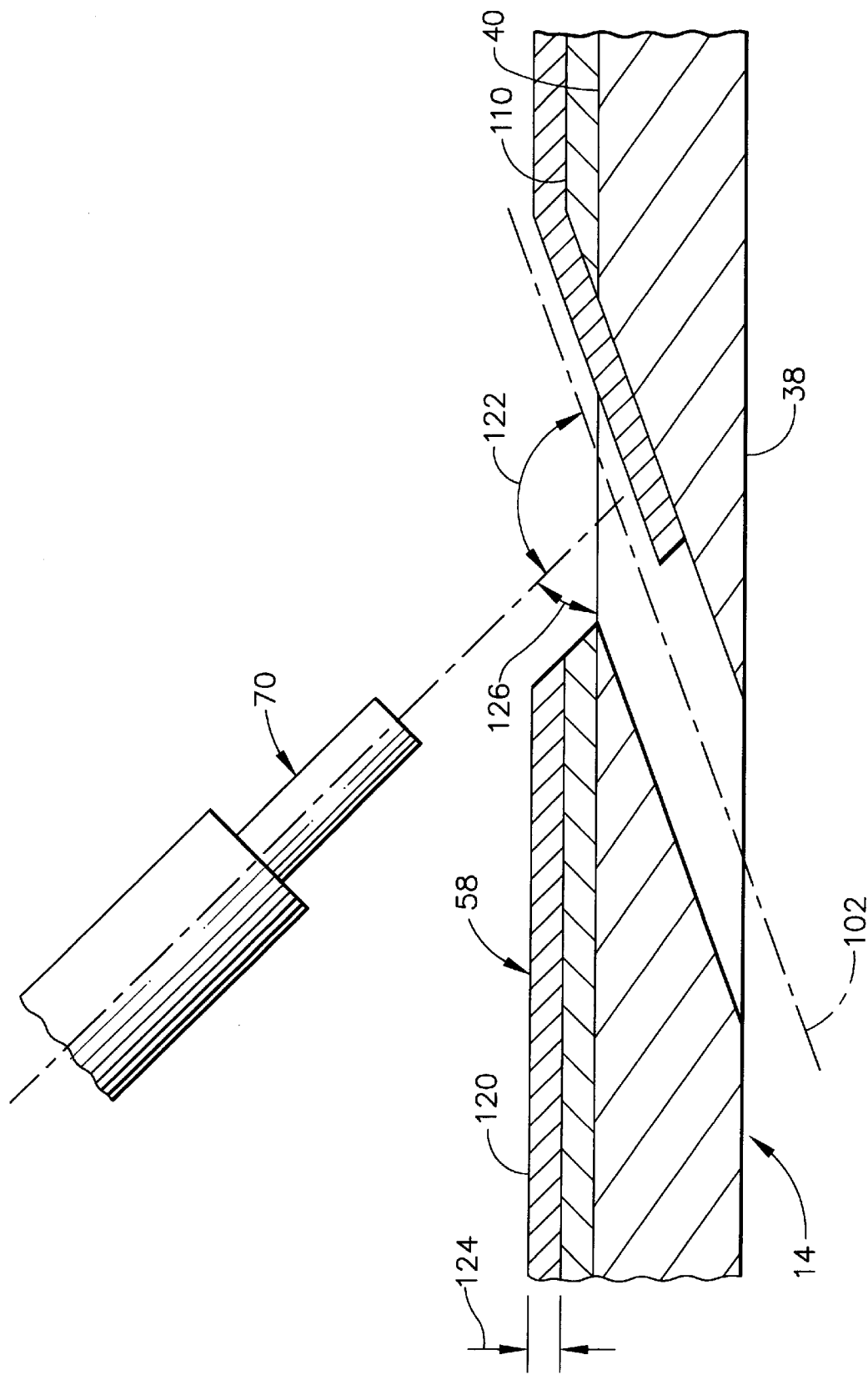
FIG. 7 is a cross section of the piece having a thermal barrier coating applied by the thermal barrier coating spray apparatus.
Figure 8:
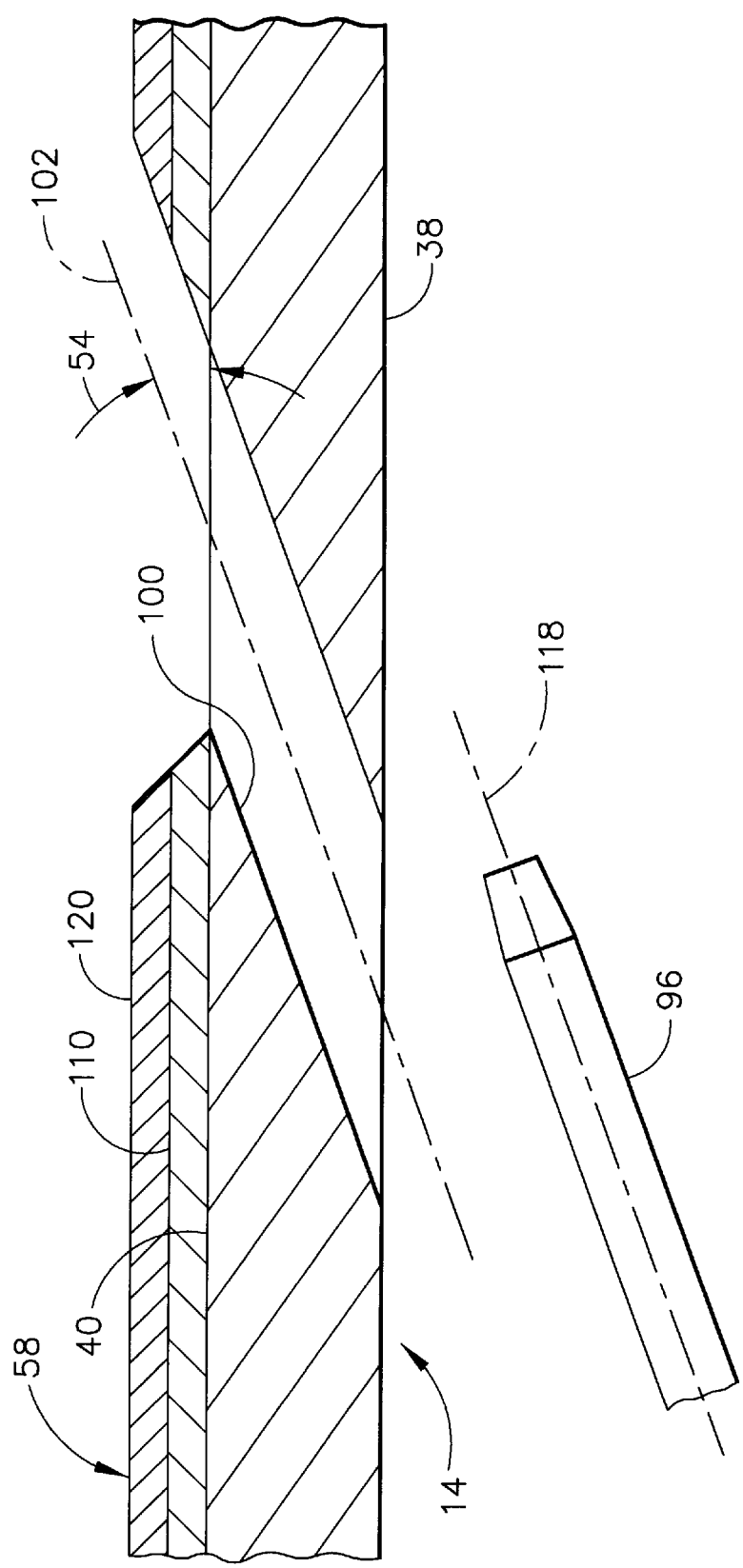
FIG. 8 is a cross section of a coated piece after the thermal barrier coating is removed from the cooling hole by the water jet apparatus.

After the bond coat 110 is removed from the hole, the liner 14 is returned to the first turntable 110. As illustrated in FIG. 7, the thermal barrier coating spray apparatus 70 sprays a thermal barrier coating 120 such as yttria stabilized zirconia on the bond coat 110 at a spray angle 122 measured with respect to the central axis 102 of the hole and to a thickness 124 selected in combination with the angle at which the thermal barrier coating is sprayed to prevent the thermal barrier coating from entirely filling the hole. Further, the thermal barrier coating 120 is preferably sprayed on the bond coat 110 at an angle of incidence 126 with respect to the bond coat surface of at least about 45 degrees. Angles of incidence 126 less than about 45 degrees tend to cause the coating 120 to have unmelted areas, voids and lower tensile strength.

As with the bond coat parameters, the spray angle 122 and the thickness 124 are selected in combination to prevent the thermal barrier coating from entirely filling the hole. For example, for the previously described liner 14 having nominal 0.020 to 0.030 inch diameter holes extending through the liner at an angle 54 of approximately twenty degrees, the thermal barrier coating 120 may be sprayed on the bond coat 110 at an angle of incidence 126 of about 45 degrees and a spray angle 122 of about 135 degrees. Further, the coating 120 is sprayed in at least one coat having a thickness 124 of between about 0.003 inches and about 0.015 inches. Preferably, the coating 120 is sprayed in a coat having a thickness 124 of about 0.010 inches. As will be appreciated by those skilled in the art, the angles and thickness may be varied without departing from the scope of the present invention. However, it is desirable that the spray angle 122 and the thickness 124 be selected so that the coating 120 does not entirely fill the hole. As with the bond coat, leaving a pilot hole in the thermal barrier coating enables the water jet to remove the coating 120 from the hole.

Although the spray angle 122 and thickness 124 specified above have been found to be effective to prevent the thermal barrier coating 120 from entirely filling the holes 42, 46, 50, those skilled in the art will appreciate that considerable process simplification can be accomplished by maintaining a constant angle of incidence 126 and allowing the spray angle to vary between the first, second and third pluralities of cooling holes. For example, for a liner 14 having cooling holes 42, 46, 50 oriented as specified above, it has been found that the thermal barrier coating 120 may be applied in a direction having no circumferential component and at an angle of incidence 126 of about 45 degrees downstream. For liners 14 having other cooling hole orientations, the spray angle 122 and thickness 124 may be determined by trial and error.

After the thermal barrier coating 120 is applied, the liner 14 is placed on the turntable support 80 adjacent the water jet apparatus 90 (FIG. 4). The water jet apparatus 90 sprays a high pressure water jet toward the hole from the nozzle 96 facing the outer surface 38 of the liner 14 and in a direction 118 generally parallel to the central axis 102 of the hole to remove thermal barrier coating from the hole. Because the water jet is substantially free of solid particulate, the jet only removes the thermal barrier coating 120 from the hole without removing metal from the liner 14. Although the water jet pressure may vary without departing from the scope of the present invention, in the preferred embodiment the water jet pressure used during this spraying step is identical to the pressure used during the prior spraying step.

After the thermal barrier coating 120 is removed from the hole, additional layers of thermal barrier coating (not shown) may be applied to the liner 14 to build the total coating thickness. Preferably, the coating 120 is removed from the hole after applying each layer. As will be appreciated by those skilled in the art, the step of spraying the liner with the water jet after the bond coat 110 is applied and before the thermal barrier coating 120 is applied may be omitted if the combined thickness of the layers is thin enough that they do not entirely fill the hole thereby allowing the layers to be removed together.

Because the water jet does not damage the base metal of the liner 14, its flow need not be interrupted as the jet travels from hole to hole. Further, where the liner 14 has a series of holes, either the liner or the water jet nozzle 96 (or both) may be moved with respect to the other to sequentially align the water jet with each of the holes in the series. For example, where the liner 14 is circular and the series of holes is oriented in a row extending circumferentially around the liner, the liner may be rotated to move the liner with respect to the nozzle 96 and to align the nozzle with each hole of the series. A motor (not shown) connected to the shaft 84 may be used to continuously rotate the turntable 80 and liner 14. Although the liner 14 and the nozzle 96 may be moved at other rates without departing from the scope of the present invention, in the preferred embodiment they are moved at a relative speed of between about twenty inches per minute and about 480 inches per minute. In a particularly preferred embodiment, the liner 14 is moved relative to the nozzle 96 at a rate of about twenty inches per minute. Although the turntable 80 of the preferred embodiment rotates continuously, it is envisioned that the turntable may be rotated intermittently so the water jet dwells when aligned with each hole.

The method of using the water jet apparatus of the second embodiment 90 is similar to that described above with respect to the water jet apparatus of the first embodiment 90. As illustrated in FIG. 3, a bond coat 110 is sprayed on the metal work liner 14 at an angle 116 and to a thickness 114 selected to prevent the bond coat from entirely filling the hole 84. The water jet apparatus 90 is used to spray a high pressure fluid jet in a direction generally parallel to the central axis 102 of the cooling holes 84 to remove bond coat 110 from them. After the bond boat 110 is removed from the holes 84, a thermal barrier coating 120 is sprayed on the bond coat 110 as shown in FIG. 5 at an angle 126 and to a thickness 124 selected to prevent the thermal barrier coating from entirely filling the hole 84. The step of spraying the high pressure fluid jet is repeated to remove thermal barrier coating 120 from the cooling holes 84.

Although the fluid jet may be sprayed at other pressures without departing from the scope of the present invention, in one embodiment the fluid jet is sprayed from the nozzle orifice 112 at a pressure of between about 5000 pounds per square inch and about 50,000 pounds per square inch, and more particularly, at a pressure of about 45,000 pounds per square inch. Although the orifice 112 of the nozzle assembly 90 may be spaced from the liner 14 by other distances without departing from the scope of the present invention, in one embodiment the orifice of the nozzle assembly is spaced from the metal liner by a distance 122 of between about 0.1 inches and about 3 inches as shown in FIG. 7 while the fluid jet is sprayed from the nozzle assembly. Further, it is envisioned that it may be beneficial that the orifice 112 of the nozzle assembly 90 be spaced from the liner 14 by a distance 122 of between about 0.8 inches and about 1.6 inches while the jet is sprayed from the assembly.

In addition, although the orifice 112 may be moved relative to the liner at other speeds without departing from the scope of the present invention, in one embodiment the orifice of the nozzle assembly 90 is moved relative to the liner 14 at a speed of between about 20 inches per minute and about 480 inches per minute as the fluid jet is sprayed from the nozzle assembly. It is further envisioned that it may be beneficial to move the orifice 112 relative to the liner 14 at a speed of about 240 inches per minute as the fluid jet is sprayed from the nozzle assembly 90. Although the nozzle assembly 90 may be aligned in other orientations without departing from the scope of the present invention, in one embodiment the nozzle assembly is aligned generally parallel to the second surface 22 of the liner 14 while the jet is sprayed from the assembly 90.

As will be appreciated by those skilled in the art, in addition to combustion chamber liners such as those described above, the present invention is applicable to other metal pieces having coatings and cooling holes extending in more than one direction. In addition, those skilled in the art will appreciate that the liner 14 may be a new liner which has never had a thermal barrier coating system or it may be a repaired liner from which damaged thermal barrier coating has been removed by conventional mechanical and/or chemical stripping processes.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of applying a thermal barrier coating system to a metal piece having a first plurality of cooling holes angled in a first direction through the piece from a first surface of the piece to a second surface of the piece opposite the first surface, and a second plurality of cooling holes angled in a second direction different than said first direction through the piece from the first surface to the second surface, said method comprising the steps of:

spraying a bond coat on said first surface of the piece at angles with respect to said first direction and said second direction and to a thickness selected in combination with the angles to prevent the bond coat from entirely filling any hole within said first plurality of cooling holes or any hole within said second plurality of cooling holes;

spraying a thermal barrier coating on the bond coat at angles with respect to said first direction and said second direction and to a thickness selected in combination with the angles to prevent the thermal barrier coating from entirely filling any hole within said first plurality of coding holes or any hole within said second plurality of cooling holes; and spraying a high pressure fluid jet from a nozzle assembly through at least one hole within said first plurality of cooling holes in a direction generally parallel to said first direction to remove at least one of said band coat and said thermal barrier coating from said at least one hole within said first plurality of cooling holes.

2. A method as set forth in claim 1 wherein the step of spraying the high pressure fluid jet from the nozzle assembly is performed at least twice, once after the step of spraying the bond coat but before the step of spraying the thermal barrier coating to remove the bond coat from said first plurality of holes and said second plurality of holes, and again after the step of spraying the thermal barrier coating to remove the thermal barrier coating from said first plurality of holes and said second plurality of holes.

3. A method as set forth in claim 1 wherein the thermal barrier coating is sprayed on said first surface in at least two coats and the step of spraying the fluid from the nozzle assembly is performed at least twice, once after spraying a first coat of said coats of thermal barrier coating and again after spraying a second coat of said coats of thermal barrier coating.

4. A method as set forth in claim 1 wherein the fluid jet is sprayed from the nozzle assembly toward the second surface of the metal piece.

5. A method as set forth in claim 1 wherein the fluid jet is sprayed from the nozzle assembly at a pressure of between about 5000 pounds per square inch and about 50,000 pounds per square inch.

6. A method as set forth in claim 6 wherein the fluid jet is sprayed from the nozzle assembly at a pressure of about 45,000 pounds per square inch.

7. A method as set forth in claim 1 wherein the nozzle assembly is spaced from the metal piece by a distance of between about 0.8 inches and about 1.6 inches while the jet is sprayed from the assembly.

8. A method as set forth in claim 1 further comprising the step of moving the nozzle assembly relative to the metal piece at a speed of between about 20 inches per minute and about 480 inches per minute as the fluid jet is sprayed from the nozzle assembly.

9. A method as set forth in claim 1 wherein the step of spraying the high pressure fluid jet further comprises spraying the high pressure fluid jet from the nozzle assembly through at least one hole within said second plurality of cooling holes in a direction generally parallel to said second direction to remove at least one of said bond coat and said thermal barrier coating from said at least one hole within said second plurality of cooling holes.

10. A method as set forth in claim 9 wherein the high pressure fluid jet is sprayed through each hole within the first plurality of cooling holes and through each hole with the second plurality of cooling holes during the step of spraying the high pressure fluid jet.

11. A method as set forth in claim 10 wherein the nozzle assembly sprays the high pressure fluid jet through each hole in said first plurality of cooling holes generally parallel to said first direction and through each hole in said second plurality of cooling holes generally parallel to said second direction.

12. A method of applying a thermal barrier coating system to an annular liner surrounding an axial centerline and extending between an upstream end and a downstream end, said liner having a first plurality of cooling holes angled in a first hole direction through the liner from an outer surface to an inner surface, and a second plurality of cooling holes angled in a second hole direction through the liner from the outer surface to the inner surface, said second hole direction having a circumferential component opposite that of said first hole direction, said method comprising the steps of:

spraying a bond coat on the inner surface in a first spray direction having an axial component to a thickness selected in combination with the first spray direction to prevent the bond coat from entirely filling any hole within said first plurality of cooling holes or any hole within said second plurality of cooling holes;

spraying a thermal barrier coating on the bond coat in a second spray direction having an axial component to a thickness selected in combination with the second spray direction to prevent the thermal barrier coating from entirely filling any hole within said first plurality of cooling holes or any hole within said second plurality of cooling holes; and spraying a high pressure fluid jet from a nozzle assembly through at least one hole within said first plurality of cooling holes in a direction generally parallel to said first direction to remove at least one of said bond coat and said thermal barrier coating from said at least one hole with in said first plurality of cooling holes.

13. A method as set forth in claim 12 wherein said first plurality of cooling holes and said second plurality of cooling holes are angled axially downstream from the outer surface to the inner surface, and the bond coat and the thermal barrier coating are sprayed axially upstream toward the inner surface of the liner.

14. A method as set forth in claim 12 wherein the liner has a third plurality of coaling holes angled axially downstream through the liner from the outer surface to the inner surface, and the bond coat and the thermal barrier coating are sprayed axially downstream toward the inner surface of the liner.

15. A method as set forth in claim 12 wherein the step of spraying the high pressure fluid jet from the nozzle assembly is performed at least twice, once after the step of spraying the bond coat but before the step of spraying the thermal barrier coating to remove the bond coat from said first plurality of holes and said second plurality of holes, and again after the step of spraying the thermal barrier coating to remove the thermal barrier coating from said first plurality of holes and said second plurality of holes.

16. A method as set forth in claim 12 wherein the thermal barrier coating is sprayed on the inner surface in at least two coats and the step of spraying the fluid from the nozzle assembly is performed at least twice, once after spraying a first coat of said coats of thermal barrier coating and again after spraying a second coat of said coats of thermal barrier coating.

17. A method as set forth in claim 12 wherein the fluid jet is sprayed from the nozzle assembly toward the outer surface of the liner.

18. A method as set forth in claim 12 wherein the step of spraying the high pressure fluid jet further comprises spraying the high pressure fluid jet from the nozzle assembly through at least one hole within said second plurality of cooling holes in a direction generally parallel to said second spray direction to remove at least one of said bond coat and said thermal barrier coating from said at least one hole within said second plurality of cooling holes.

19. A method as set forth in claim 18 wherein the high pressure fluid jet is sprayed through each hole within the first plurality of cooling holes and through each hole with the second plurality of cooling holes during the step of spraying the high pressure fluid jet.

20. A method as set forth in claim 19 wherein the nozzle assembly sprays the high pressure fluid jet through each hole in said first plurality of cooling holes generally parallel to said first spray direction and through each hole in said second plurality of cooling holes generally parallel to said second direction.

* * * * *